(12) United States Patent
Yamazaki et al.

(10) Patent No.: US 6,517,464 B2
(45) Date of Patent: Feb. 11, 2003

(54) APPARATUS AND METHOD FOR DETERMINING A STATE OF A POWER TRAIN

(75) Inventors: Makoto Yamazaki, Susono (JP); Toshifumi Takaoka, Susono (JP); Naoto Suzuki, Fujinomiya (JP); Takashi Suzuki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/909,826

(22) Filed: Jul. 23, 2001

(65) Prior Publication Data

US 2002/0019294 A1 Feb. 14, 2002

(30) Foreign Application Priority Data

Aug. 1, 2000 (JP) .......................................... 2000-233692

(51) Int. Cl.$^7$ ............................................... B60K 41/02
(52) U.S. Cl. ............................... 477/5; 180/65.2; 475/5
(58) Field of Search ........................... 180/65.2; 475/5; 477/3, 5

(56) References Cited

U.S. PATENT DOCUMENTS 6,003,626 A * 12/1999 Ibaraki et al. .............. 180/65.2
6,098,733 A * 8/2000 Ibaraki et al. .............. 180/65.2
6,321,150 B1 * 11/2001 Nitta ............................ 701/29
6,329,772 B1 * 12/2001 Ochiai et al. ............... 318/139
6,359,405 B1 * 3/2002 Tsuruni ...................... 318/434
6,337,880 B1 * 4/2002 Kato et al. .................... 701/29
6,380,641 B2 * 4/2002 Matsubara et al. ....... 290/40 C
6,382,335 B2 * 5/2002 Takashima et al. ........ 180/65.2

FOREIGN PATENT DOCUMENTS

| JP | A 5-168102 | 7/1993 |
| JP | A 10-196427 | 7/1998 |
| JP | A 11-69509 | 3/1999 |

* cited by examiner

Primary Examiner—Dirk Wright
(74) Attorney, Agent, or Firm—Oliff & Berridge, PLC (57) ABSTRACT

An apparatus and method determine a state of a power train that includes a power transmission apparatus that is configured to transmit power of a first driving power source to an input side of a second driving power source via a clutch and a transmission, and is capable of changing a torque capacity of the clutch and a gear ratio of the transmission. The apparatus and method determine a state of the clutch or the transmission based on a revolution speed of the first driving power source and information indicating a state of the second driving power source, e.g., a revolution speed of the input side of the second driving power source.

26 Claims, 7 Drawing Sheets

APPARATUS AND METHOD FOR DETERMINING A STATE OF A POWER TRAIN

INCORPORATION BY REFERENCE

The disclosure of Japanese Patent Application No. 2000-233692 filed on Aug. 1, 2000, including the specification, drawings and abstract is incorporated herein by reference in its entirety.

BACKGROUND OF THE INVENTION

1. Field of Invention

The invention relates to an apparatus and method for determining a state of a power train having a power transmission apparatus provided on the output side of a driving power source.

2. Description of Related Art

In general, a driving power source is mounted on a vehicle, and a power train is configured so as to transmit the power of the driving power source to the wheels via a power transmission apparatus. Japanese Laid-Open Patent Publication No. 10-196427 describes an example of a controller of a vehicle having such a power train.

The aforementioned publication describes a hybrid vehicle having a plurality of driving power sources, specifically an internal combustion engine and a motor generator. A first clutch is provided in a power transmission path from the engine to a transmission, and a second clutch is provided in a power transmission path from the motor generator to the transmission. A battery is connected to the motor generator through an inverter. When both the engine and the motor generator operate normally, the first and second clutches are engaged/disengaged based on a predetermined normal control mode, and the vehicle runs with the power of at least one or both of the engine and the motor generator.

If at least either the engine or the motor generator fails, a failure control mode different from the normal control mode is selected. In this mode, whether the engine has failed or not is determined based on the fuel injection amount, throttle valve opening, engine speed, and the like. Whether the motor generator has failed or not is also determined based on the revolution speed of the motor generator, road friction coefficient, vehicle speed, and the like. If it is determined that the engine is not operating normally and the failure control mode is selected, the vehicle runs with the motor generator as a driving power source. On the other hand, if the motor generator has failed, a control is carried out in which the vehicle runs with the engine as a driving power source.

The driving controller of the aforementioned publication determines whether or not there is a failure in each driving power source itself based on the information such as revolution speed of the driving power source, but does not recognize any failure that may have occurred in the power transmission apparatus coupled to the output side of the driving power source, e.g., clutch and brake. This results not only in an inability to determine whether or not there is a failure in the power transmission apparatus, but also requires the provision of a special (dedicated) failure determination apparatus in order to determine whether or not there is such failure. Accordingly, further improvement is possible in this respect.

SUMMARY OF THE INVENTION

It is one object of the invention to provide an apparatus and method for determining a state of a power train, which is capable of determining, with an existing system, a failure in a power transmission apparatus coupled to an output side of a driving power source, without the need for a special failure determination apparatus.

In a first aspect of the invention, an apparatus for determining a state of a power train that is configured to transmit power of a first driving power source to an input side of a second driving power source via a power transmission apparatus, and is capable of controlling a power transmission state of the power transmission apparatus, determines the power transmission state of the power transmission apparatus based on a physical quantity associated with a revolution speed of the first driving power source and information indicating a state of the second driving power source.

According to one implementation of the aforementioned aspect, the state of the power transmission apparatus is determined based on the revolution speed of the first driving power source and the revolution speed of the input side of the second driving power source. Accordingly, the revolution speed of the first driving power source and the revolution speed of the input side of the second driving power source can be utilized as information in a wider range of applications than previously used, and the need for a special (dedicated) failure determination apparatus for determining the state of the power transmission apparatus is eliminated.

In the aforementioned aspect, the power transmission apparatus may include a clutch and a transmission, and a determination can be made, when either the clutch or the transmission has a normal power transmission state, regarding a power transmission state of the other, based on the physical quantity associated with the revolution speed of the first driving power source and the information indicating the state of the second driving power source.

Thus, assuming that either the clutch or the transmission operates normally, the power transmission state of the other is determined based on the physical quantity associated with the revolution speed of the first driving power source and the information indicating the state of the second driving power source. Accordingly, accuracy of determining the power transmission state of the clutch or the transmission is improved.

In the aforementioned aspect, examples of the power transmission states of the power transmission apparatus include whether or not there is a failure (abnormality) in which the torque capacity or gear ratio is incapable of being controlled, whether or not there is a failure in which the gear ratio is not able to be set, progress or transitional state in changing the torque capacity or gear ratio, and the like.

In the aforementioned aspect, examples of the physical quantities associated with the revolution speed of the driving power source include the revolution speed itself of the driving power source, as well as the state of an apparatus for controlling the revolution speed of the driving power source, e.g., a throttle opening amount, etc.

In a second aspect of the invention, an apparatus for determining a state of a power train includes a driving power source, a power transmission apparatus coupled to an output side of the driving power source, and a controller that determines a failure in the power transmission apparatus based on a revolution speed of the driving power source.

In one implementation of the second aspect, a failure in the power transmission apparatus is determined based on a physical quantity associated with the revolution speed of the driving power source. Accordingly, the revolution speed of the driving power source can be utilized in a wider range of applications than previously used, i.e., as information other than that for controlling the driving power source, and the need for a special (dedicated) failure determination apparatus for determining the state of the power transmission apparatus is eliminated.

In the second aspect, the power transmission apparatus may include a clutch and a transmission, configured to transmit power of the driving power source to the transmission via the clutch, and the controller may determine, when either the clutch or the transmission operates normally, a failure in the other, based on a physical quantity associated with the revolution speed of the driving power source.

Thus, assuming that the clutch operates normally, a failure in the transmission is determined based on the physical quantity associated with the revolution speed of the driving power source. Accordingly, accuracy of determining a failure in the transmission is improved.

In the aforementioned aspect, the controller may determine that a failure has occurred, when the clutch operates normally and the revolution speed of the driving power source does not correspond to a revolution speed corresponding to a prescribed gear ratio that is set by the transmission, the determined failure being one in which the gear ratio of the transmission is incapable of being set to the prescribed gear ratio.

Thus, provided that the clutch operates normally, if the revolution speed of the driving power source does not correspond to the revolution speed corresponding to the prescribed gear ratio that is set by the transmission, it is determined that the failure in which the gear ratio of the transmission is incapable of being set to the prescribed gear ratio has occurred. Accordingly, a failure in the transmission can be determined specifically.

In the aforementioned aspect, the controller may determine that a failure has occurred, when the clutch operates normally and the revolution speed of the driving power source does not correspond to any one of the revolution speeds respectively corresponding to all of the gear ratios that are set by the transmission, the determined failure being one in which a gear ratio thereof is unable to be set to any one of the gear ratios.

Thus, provided that the clutch operates normally, if the revolution speed of the driving power source does not correspond to any one of the revolution speeds respectively corresponding to all of the gear ratios that are set by the transmission, it is determined that the failure in which the gear ratio of the transmission to any gear ratios is unable to be set has occurred. Accordingly, a failure in the transmission can be determined specifically.

In the aforementioned aspect, the controller may determine that a failure in which the gear ratio of the transmission is incapable of being changed has occurred, when the clutch operates normally and the revolution speed of the driving power source does not change in response to a request to change the gear ratio of the transmission.

Thus, provided that the clutch operates normally, a gear change request is generated to change the gear ratio of the transmission, and if the revolution speed of the driving power source does not change, it is determined that the failure in which the gear ratio of the transmission is incapable to be changed has occurred. Accordingly, a failure in the transmission can be determined specifically.

In the second aspect, a failure in either the clutch or the transmission is determined based on information other than the revolution speed of the driving power source.

In the first and second aspects, the power transmission states of the power transmission apparatus include, for example, a torque capacity transmitted between an input-side rotating member and an output-side rotating member of the power transmission apparatus, and a ratio between the revolution speed of the input-side rotating member and the revolution speed of the output-side rotating member of the power transmission apparatus, i.e., a gear ratio. A failure in either the clutch or the transmission may be determined based on information other than the revolution speed of the first driving power source and the revolution speed of the second driving power source.

Further, in the first and second aspects, examples of failures include a failure in the power transmission apparatus (transmission, clutch) itself, a failure in an actuator for controlling the power transmission state of the power transmission apparatus, and a failure in a signal system of a detector for detecting a request to control the power transmission state. Still further, in the first aspect, the information indicating the state of the second driving power source includes a physical quantity associated with the revolution speed of the input side of the second driving power source, e.g., the revolution speed itself, as well as a state of an apparatus for controlling that revolution speed.

Other aspects of the invention relate to methods of determining the state of a power train as described above.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 2:
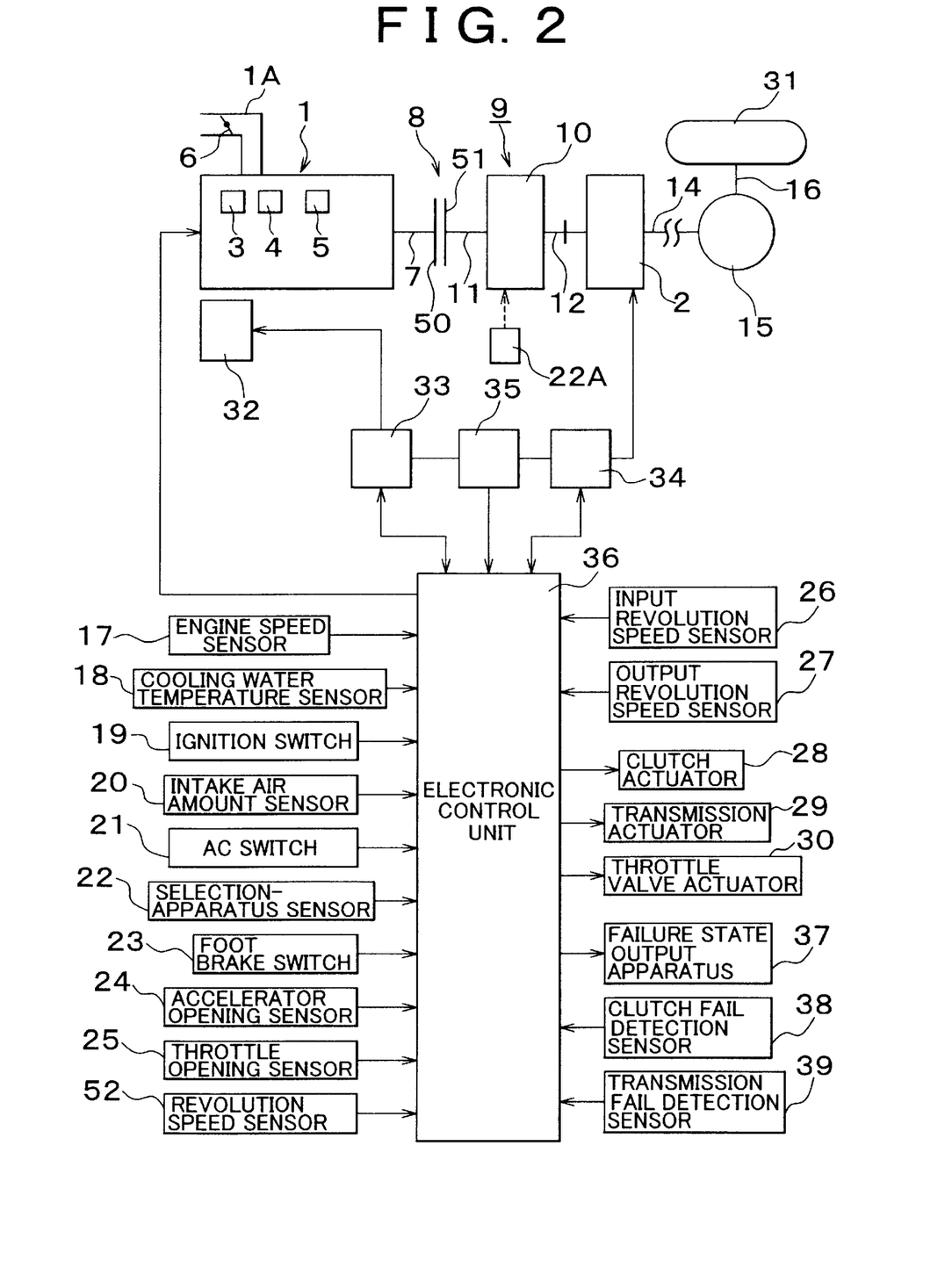
FIG. 2 is a diagram showing a power train and its control system in a hybrid vehicle to which the invention may be applied.

Hereinafter, embodiments of the invention will be described in connection with the accompanying drawings. FIG. 2 is a block diagram showing a power train of a hybrid vehicle and a control system of the power train. An engine 1 and a motor generator (MG) 2 are provided as driving power sources of the vehicle. The engine 1 is an apparatus for outputting power (i.e., torque) generated by fuel combustion. An internal combustion engine, e.g., gasoline engine, diesel engine or liquefied petroleum gas (LPG) engine, can be employed as the engine 1. For convenience, it is assumed in the present embodiment that a gasoline engine is used as the engine 1. The engine 1 has a known structure including an igniter 3, a fuel injection system 4, a cooling system 5, an electronic throttle valve 6, and the like. The electronic throttle valve 6 is provided within an intake pipe 1A of the engine 1.

A transmission 9 is coupled to one end of a crankshaft 7, i.e., an output member of the engine 1, through a clutch 8.

The clutch 8 includes an input-side rotating member 50 and an output-side rotating member 51. The input-side rotating member 50 is coupled to the crankshaft 7, and the output-side rotating member 51 is coupled to the transmission 9. A frictional clutch, hydraulic clutch or electromagnetic clutch may be used as the clutch 8.

When a hydraulic clutch is used as the clutch 8, kinetic energy of a fluid causes power transmission between the input-side rotating member 50 and the output-side rotating member 51. The hydraulic clutches include a torque converter having a function to amplify the torque transmitted between the input-side rotating member 50 and the output-side rotating member 51, and a fluid coupling that does not have such a function. The torque capacity of the torque converter is determined based on the speed ratio between the input-side rotating member 50 and the output-side rotating member 51. This torque capacity can be controlled by using a known variable-capacity torque converter.

A lock-up clutch (not shown) may also be provided in addition to the torque converter in order to switch a power transmission state between the input-side rotating member 50 and the output-side rotating member 51. Since the lock-up clutch is capable of being selectively switched among engaged, disengaged and slipped states, engaging or slipping the lock-up clutch causes power transmission between the input-side rotating member 50 and the output-side rotating member 51 by frictional force. Accordingly, when a torque converter having a lock-up clutch is used as the clutch 8, the torque capacity is determined based on the factors including the engaging pressure of the lock-up clutch.

When a frictional clutch is used as the clutch 8, the input-side rotating member 50 and the output-side rotating member 51 are mechanically engaged with and disengaged from each other. In the frictional clutch, the torque capacity between the input-side rotating member 50 and the output-side rotating member 51 is determined by frictional force. Further, when an electromagnetic clutch is used as the clutch 8, the torque capacity between the input-side rotating member 50 and the output-side rotating member 51 is determined by electromagnetic force. A clutch actuator 28 is provided for controlling engagement/disengagement of the clutch 8.

When a frictional clutch or a torque converter with a lock-up clutch is used as clutch 8, the clutch actuator 28 can comprise a hydraulic circuit, a solenoid valve, and the like, while when a non-contact electromagnetic clutch is used as the clutch 8, the clutch actuator 28 can comprise an electromagnetic coil, a slip ring, a brush, and the like. A contact-type electromagnetic clutch may be used as the clutch 8. The contact-type electromagnetic clutch can be said to be a type of frictional clutch.

A transmission having at least either the function to automatically (electrically) control the gear ratio based on the running state of the vehicle or the function to manually switch the gear ratio by the driver's operation can be used as the transmission 9.

First, an exemplary structure of the transmission 9 capable of automatically controlling the gear ratio based on the running state of the vehicle will be described. The transmission 9 includes a gearshift mechanism 10, an input-side rotating member 11 coupled to the input side of the gearshift mechanism 10, and an output-side rotating member 12 coupled to the output side of the gearshift mechanism 10. The input-side rotating member 11 is coupled to the output-side rotating member 51 of the clutch 8. A continuously variable transmission capable of varying the gear ratio in a stepless manner (continuously), or a step transmission capable of varying the gear ratio in a step-by-step manner (discontinuously) can be used as the transmission 9.

When a step transmission is used as the transmission 9, the gearshift mechanism 10 can comprise a known planetary gear mechanism (not shown), a known frictional engaging apparatus (not shown), and the like. Examples of frictional engaging apparatus include a clutch and a brake.

A transmission actuator (e.g., hydraulic controller) 29 is provided for controlling the gear ratio of the gearshift mechanism 10. The transmission actuator 29 switches a plurality of frictional engaging apparatus between the engaged and disengaged states so as to control the gear ratio (gear) of the transmission 9. In such a step transmission, the torque capacity between the input-side rotating member 11 and the output-side rotating member 12 is determined by the engaging pressure of the frictional engaging apparatus controlled by the transmission actuator 29.

In contrast, when a continuously variable transmission is used as the transmission 9, a known belt-type continuously variable transmission or a known toroidal-type continuously variable transmission can be used. When a belt-type continuously variable transmission is used as the transmission 9, the gearshift mechanism 10 can comprise a driving pulley (not shown) coupled to the input-side rotating member 11, a driven pulley (not shown) coupled to the output-side rotating member 12, and a belt (not shown) wound in grooves of the driving and driven pulleys respectively.

In such a belt-type continuously variable transmission, the groove width of the driving pulley and the groove width of the driven pulley can be controlled with the transmission actuator 29. The gear ratio of the belt-type continuously variable transmission is controlled by controlling the radius of the belt wound onto the driving pulley. The tension of the belt can be controlled by controlling the groove width of the driven pulley. In other words, in the belt-type continuously variable transmission, the torque capacity between the input-side rotating member 11 and the output-side rotating member 12 is determined by the tension of the belt.

When a toroidal-type continuously variable transmission is used as the transmission 9, the gearshift mechanism 10 can comprise a driving disk (not shown) coupled to the input-side rotating member 11, a driven disk (not shown) coupled to the output-side rotating member 12, and a power roller (not shown) contacting the toroidal surface of the driving disk and the toroidal surface of the driven disk, respectively. The gear ratio of the toroidal-type continuously variable transmission is controlled by controlling the contact radius between the driving and driven disks and the power roller. In such a toroidal-type continuously variable transmission, the contact radius between the driving and driven disks and the power roller as well as the pressing force of the power roller against each disk can be controlled with the transmission actuator 29. The transmission actuator 29 used to control the transmissions 9 of various structures as described above is a known actuator such as a hydraulic circuit, a solenoid value, and the like.

In the toroidal-type continuously variable transmission, the driving and driven disks and the power roller are separated by oil, respectively, and power transmission occurs between each disk and the power roller by the oil forming a glassy substance. Therefore, to be more accurate, each disk does not contact the power roller. Thus, the toroidal-type continuously variable transmission transmits power by so-called traction transmission, and the torque capacity between the input-side rotating member 11 and the output-side rotating member 12 is determined by the pressing force of the power roller against each disk, the shearing force of the oil, and the like.

When a continuously variable transmission is used as the transmission 9, a forward/reverse movement switching mechanism (not shown) is provided in a power transmission path from the output-side rotating member 51 of the clutch 8 to the input-side rotating member 11 of the transmission 9. This forward/reverse movement switching mechanism comprises a clutch, a brake, a planetary gear mechanism, and the like. Switching the clutch and brake between engaged and disengaged states changes the rotation direction of the input-side rotating member 11 of the transmission 9 with respect to the rotation direction of the crankshaft 7, whereby the traveling direction of the vehicle is switched between forward and reverse directions.

Hereinafter, an exemplary structure of the transmission 9 capable of manually switching the gear ratio by the driver's operations will be described. The gearshift mechanism 10 of the transmission 9 can comprise a train of gears meshing with each other, and a synchromesh mechanism for switching a power transmission path of the gear train. In such a transmission 9, the driver's manual operation activates a control-force transmission mechanism such as a link and a lever, so that the synchromesh mechanism is operated. Accordingly, the gear ratio of the transmission 9 is switched in a step-by-step manner. In the transmission 9 of such structure, the torque capacity between the input-side rotating member 11 and the output-side rotating member 12 is determined by the meshing force or engaging force between the synchromesh mechanism and the gear train.

As described above, transmissions of various structures can be selected as the transmission 9. The transmission capable of manually switching the gear ratio by the driver's operation may be configured to be capable of automatically controlling the gear ratio based on the running state of the vehicle. This can be implemented by enabling the transmission actuator 29 to control the operation of the synchromesh mechanism. Moreover, the transmission capable of automatically switching the gear ratio based on the running state of the vehicle may be configured to be capable of manually switching the gear ratio by the driver's operation. This can be implemented by enabling the transmission actuator 29 to electrically operate according to the manual operation of the driver. In this case, the gear ratio of both the continuously variable transmission and the step transmission can be manually controlled, enabling the gear ratio of the continuously variable transmission to be controlled in a step-by-step manner also. Further, whatever structure is employed as the transmission 9, it is possible for the transmission 9 to have both the function to automatically switch the gear ratio based on the running state of the vehicle and the function to manually switch the gear ratio by the driver's operation.

Yet further, a gearshift control selection apparatus 22A for controlling the transmission 9 is also provided. The gearshift control selection apparatus 22A is operated by the driver. Operating the gearshift control selection apparatus 22A enables selection of the gear ratio (gear) of the transmission 9, control range of the gear ratio of the transmission 9, traveling direction of the vehicle, control mode of the gear ratio (manual control of the gear ratio by the driver's operation or automatic control of the gear ratio based on the running state of the vehicle), and the like. The gearshift control selection apparatus 22A may be of a lever type, touch-panel type, push-button type, rotating-knob type, voice-input type, and the like.

First, the operation of selecting the control mode of the gear ratio will be described. This is an operation of selectively switching the control mode of the gear ratio between an automatic control mode capable of controlling the gear ratio of the transmission 9 based on the running state of the vehicle and a manual switching mode capable of switching the gear ratio of the transmission 9 based on the manual operation of the driver.

Next, the operation of selecting the control range of the gear ratio will be described. This operation is conducted while the automatic control mode is selected. For example, when a step transmission is used as the transmission 9, the shift position can be selectively switched among, e.g., P (parking), R (reverse), N (neutral), D (drive), third, second, and L (low) positions. The P and N positions are non-driving positions. Therefore, when the P or N position is selected, the frictional engaging apparatus of the gearshift mechanism 10 is controlled so that the power transmission path between the input-side rotating member 11 and the output-side rotating member 12 of the transmission 9 can no longer transmit the torque therethrough.

In contrast, the shift positions such as R, D, third, second and L positions are driving positions. Therefore, when any one of the R, D, third, second and L positions is selected, the frictional engaging apparatus of the gearshift mechanism 10 is controlled so that the power transmission path between the input-side rotating member 11 and the output-side rotating member 12 of the transmission 9 can transmit the torque therethrough. Thus, a prescribed gear is set. In a driving position, forward and reverse gears can be selectively switched by switching the frictional engaging apparatus between the engaged and disengaged states. For example, four forward gears and a reverse gear can be set.

More specifically, when the R position is selected, the gear ratio of the transmission 9 is held constant. When the D position is selected, any gear can be selected freely in the range from the first to fourth gears. When the third position is selected, the gear can be selected freely in the range from the first to third gears. When the second position is selected, the gear can be selected freely between the first and second gears. When the L position is selected, the first gear is fixed. Thus, when any one of the third, second, L, or R positions is selected, the control range of the gear ratio is regulated accordingly.

The operation of selecting the gear ratio (gear) of the transmission 9 will now be described. This operation is conducted when the manual switching mode is selected. For example, it is assumed that a step transmission capable of setting to four forward gears and a reverse gear is used as the transmission 9. In this case, a mechanical element such as a lever is activated (or the transmission actuator 29 is actuated electrically) to switch the gear ratio of the transmission 9, according to the operation of selectively switching the forward speeds (gearshift request).

The operation of selecting the traveling direction of the vehicle will now be described. This operation can be conducted whether the manual switching mode or the automatic control mode is selected. More specifically, in response to the operation of switching between the forward gears and reverse gear, the gearshift mechanism 10 is activated to control the rotating direction of the output-side rotating member 12 of the transmission 9, thereby switching the traveling direction of the vehicle to the forward or reverse direction.

The motor generator 2 functions both as an electric motor for receiving electric energy (electric power) and outputting torque, and as a generator for converting mechanical energy into electric power. For example, a permanent magnet synchronous motor can be used as the motor generator 2. Thus, the engine 1 and the motor generator 2 generate power according to different principles. A rotor (not shown) of the motor generator 2 is coupled to a power transmission shaft 14, and one end of the power transmission shaft 14 is coupled to the output-side rotating member 12 of the transmission 9. A revolution speed detection sensor (e.g., resolver) 52 is also provided for detecting the revolution speed of the power transmission shaft 14.

Furthermore, the other end of the power transmission shaft 14 is coupled to a differential 15, and a wheel 31 is coupled to the differential 15 through a drive shaft 16. Thus, the motor generator 2 is disposed in the power transmission path between the transmission 9 and the differential 15.

A motor generator 32 is coupled to the crankshaft 7. The motor generator 32 functions both as an electric motor for receiving electric power and outputting power, and a generator driven by the engine 1 to generate electric power. For example, a permanent magnet synchronous motor can be used as the motor generator 32. The motor generator 32 is primarily used to start the engine 1.

A battery 35 is connected to the motor generators 2 and 32 through inverters 33 and 34, respectively, and at the same time, an electronic control unit (ECU) 36 is connected to the inverters 33, 34 and the battery 35. The ECU 36 comprises a microcomputer including as its main components a central processing unit (CPU or MPU), a storage device (RAM and ROM) and an input/output (I/O) interface.

The ECU 36 receives signals from various components, including: a signal of an engine speed sensor 17; a signal of a cooling water temperature sensor 18; a signal of an ignition switch 19; a signal of an intake air amount sensor 20; a signal indicating a state of charge (SOC) of the battery 35; a signal of an air-conditioning switch 21; a signal of a selection-apparatus sensor 22 for detecting operation of the gearshift control selection apparatus 22A; a signal of a foot brake switch 23; a signal of an accelerator opening sensor 24; a signal of a throttle opening sensor 25; a signal of an input revolution speed sensor 26 for detecting the revolution speed of the input-side rotating member 11; a signal of a clutch fail detection sensor 38 for detecting a failure in the clutch 8 itself or the clutch actuator 28; a signal of a transmission fail detection sensor 39 for detecting a failure in the transmission 9 itself or the transmission actuator 29; a signal of an output revolution speed sensor 27 for detecting the revolution speed of the output-side rotating member 12; and a signal of the revolution speed detection sensor 52. The vehicle speed is calculated based on the signal of the output revolution speed sensor 27. The gearshift control mode of the transmission 9 can be determined based on the signals of the input revolution speed sensor 26, output revolution speed sensor 27 and engine speed sensor 17, and the state of the clutch 8, and the like.

On the other hand, the ECU 36 outputs signals including: a signal for controlling the igniter 3; a signal for controlling the fuel injection apparatus 4; a signal to an actuator (e.g., motor) 30 for controlling the opening of the electronic throttle valve 6; a signal for controlling the motor generators 2 and 32 through the inverters 33 and 34 respectively; a signal to the clutch actuator 28; a signal to the transmission actuator 29; and a signal to a failure state output apparatus 37 for notifying the driver whether or not there is a failure in the power transmission apparatus and specific conditions of the failure. The failure state output apparatus 37 acoustically and/or visually notifies the driver of the state and specific failure in the power transmission apparatus via a system such as speaker, buzzer, chime, lamp and/or display.

The engine 1 functions as a first driving power source; the clutch 8 and the transmission 9 function as a power transmission apparatus; and the motor generator 2 functions as a second driving power source.

In the hybrid vehicle of FIG. 2, the entire vehicle is controlled based on input signals to the ECU 36 and pre-stored data in the ECU 36. The ECU 36 stores a driving power source control map in which an engine driving region and a motor generator driving region are set. This driving power source control map controls driving/stopping of the engine 1 and the motor generator 2, using the running state of the vehicle, e.g., accelerator opening and vehicle speed, as parameters. When a request to start the engine is generated, the motor generator 32 is driven according to the map. Then, the power of the motor generator 32 causes initial revolution of the engine 1 as well as fuel injection control, ignition control and intake/exhaust control, so that the engine 1 revolves autonomously. At this point, the engine speed can be controlled by adjusting the intake air amount.

When the running state of the vehicle corresponds to the motor generator driving region, the motor generator 2 is driven with the electric power of the battery 35, so that the vehicle runs with the power of the motor generator 2. This is so-called a MG running control. Basically, the engine 1 is independently driven in the engine driving region, whereas the motor generator 2 is independently driven in the motor generator driving region.

In the case where the running state of the vehicle corresponds to the engine driving region and the engine torque is not enough with respect to the required driving power, the torque can be compensated for by driving the motor generator 2 as an electric motor. More specifically, the torque to be allocated to the engine 1 and the torque to be allocated to the motor generator 2 are calculated based on the required driving power, and the engine 1 and the motor generator 2 are controlled based on the calculation result. In order to control the motor generator, an actual revolution speed is calculated based on a signal of the revolution speed detection sensor 52 and is controlled toward a target revolution speed. The revolution speed of the motor generator 2 is controlled by adjusting a current value of the electric power supplied from the battery 35 to the motor generator 2.

On the other hand, when a transmission capable of automatically controlling the gear ratio based on the running state of the vehicle is used as the transmission 9, gearshift patterns (gearshift maps) for controlling the gear ratio of the transmission 9 are stored in the ECU 36. With these gearshift maps, gearshifting of the transmission 9 is determined using the vehicle speed, accelerator opening amount, and the like as parameters. Then, a gearshift instruction signal is input to the transmission actuator 29 based on the determination result. The transmission actuator 29 controls the gearshift mechanism 10 based on the gearshift instruction signal. When a torque converter with a lock-up clutch is used as the clutch 8, a lock-up clutch control map is stored in the ECU 36 in order to control engagement, disengagement and slippage of the lock-up clutch. Whether to engage, disengage or slip the lock-up clutch is determined based on the lock-up clutch control map. A control signal based on the determination result is input to the clutch actuator 28, whereby the lock-up clutch is activated accordingly.

When a transmission capable of automatically controlling the gear ratio based on the running state of the vehicle is used as the transmission 9, a control signal for disengaging the clutch 8 during gearshift as well as engaging the clutch 8 upon completion of the gearshift is input to the clutch actuator 28. The clutch 8 is also controlled according to driving/stopping of the engine 1 and the motor generator 2. When the clutch 8 in the power train of FIG. 2 is engaged, the engine torque is transmitted to the power transmission shaft 14 via the transmission 9, and the torque of the power transmission shaft 14 is transmitted to the wheel 31 via the differential 15. If the motor generator 2 is driven, the torque of the motor generator 2 is also transmitted to the wheel 31. In the case where the motor generator 2 is independently driven to transmit its torque to the wheel 31, the clutch 8 can be disengaged.

During deceleration (i.e., coasting) of the vehicle, the power of the wheel 31 is transmitted to the motor generator 2, and at the same time the motor generator 2 is operated as an electric generator so as to charge the battery 35 with the electric power thereof. Thus, regenerative braking force can be generated. During the regenerative braking with the motor generator 2, the clutch 8 is disengaged so as to enable improved generating efficiency of the motor generator 2.

When a transmission capable of manually switching the gear ratio by the driver's operation is used as the transmission 9, the clutch 8 may be engaged and disengaged by the driver's depressing of a clutch pedal or the like. Alternatively, the clutch 8 may be automatically engaged and disengaged by the clutch actuator 29. The torque capacity of the clutch 8 is calculated based on the engine torque. The torque capacity of the transmission 9, i.e., the engaging pressure of the frictional engaging apparatus, tension of the belt, pressing force of the power roller against each disk, and the like, is controlled based on the engine torque, gear ratio, state of the clutch 8, and the like.

Figure 1:
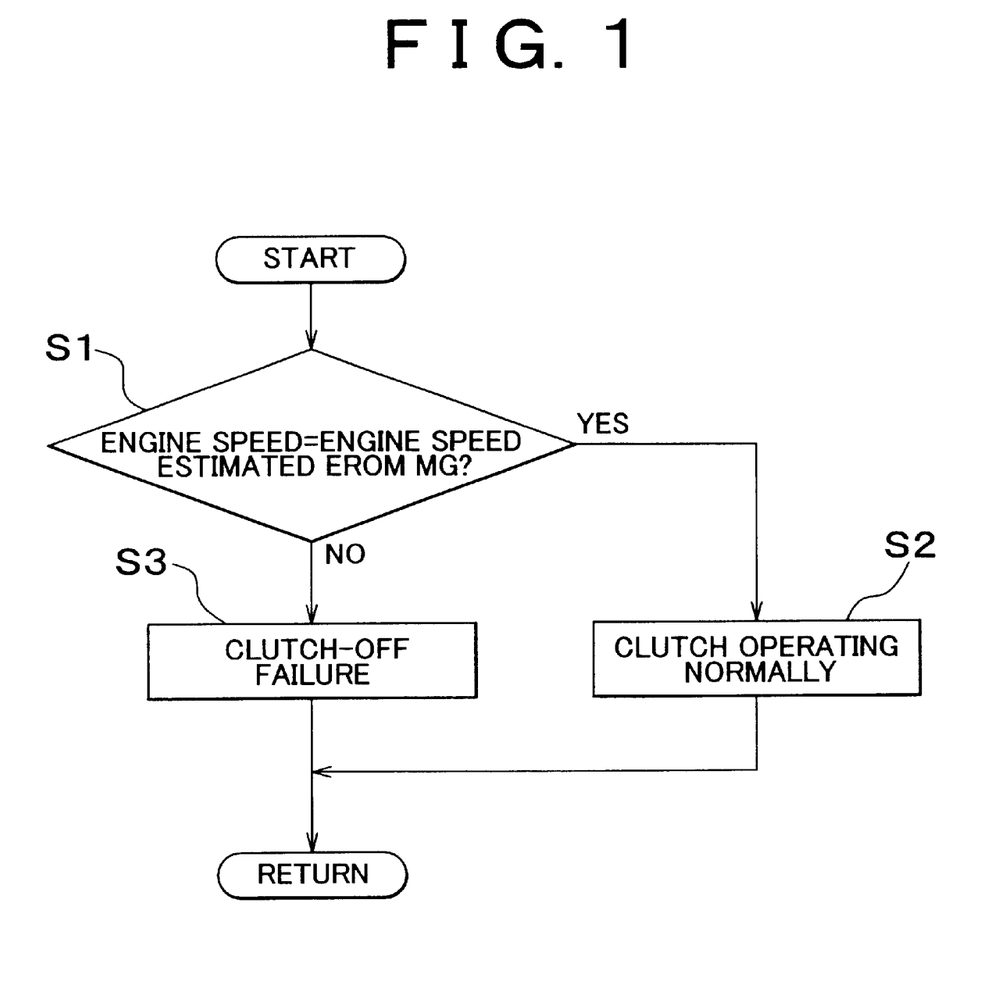
FIG. 1 is a flowchart illustrating an embodiment of a control process according to the invention.

Here, a control example will now be described in connection with the flowchart of FIG. 1. In this control example, the state of the clutch 8 is determined based on the engine speed and the input revolution speed of the motor generator 2. The control example of FIG. 1 is conducted on the assumption that the transmission 9 is operating normally. Whether or not the transmission 9 is operating normally can be determined based on the signal of the transmission fail sensor 39, signal of the input revolution speed sensor 26, signal of the output revolution speed sensor 27, and the like. The transmission 9 operating normally means that the gear ratio as determined from the signal of the selection apparatus sensor 22, gearshift maps, and the like can be actually set with the transmission 9.

In the control example of FIG. 1, it is determined whether or not an actual engine speed calculated from the signal of the engine speed sensor 17 is equal to an estimated engine speed calculated from the input revolution speed of the motor generator 2 (step S1). Here, the input revolution speed of the motor generator 2 is calculated based on the signal of the revolution speed sensor 52. The estimated engine speed means the engine speed calculated based on the input revolution speed of the motor generator 2 and the gear ratio of the transmission 9. If YES in step S1, it is determined that the clutch 8 is operating normally (step S2), and the routine returns to start.

If NO in step S1, specifically, if the actual engine speed is higher than the estimated engine speed, it is determined that the clutch 8 is failed (step S3), and the routine returns to start. For example, when a frictional clutch (including a contact-type electromagnetic clutch) or a torque converter with a lock-up clutch is used as the clutch 8 and a request to engage the clutch 8 with a prescribed engaging pressure has been generated, if the process proceeds from step S1 to step S3, it is determined in step S3 that a failure in which the clutch 8 is incapable to be engaged (i.e., a clutch-off failure) or a failure in which the engaging pressure of the clutch 8 is incapable to be raised to the required value has occurred.

Alternatively, when a non-contact electromagnetic clutch or a variable-capacity torque converter is used as the clutch 8 and a request to control the torque capacity of the clutch 8 to a prescribed value has been generated, if the process proceeds from step S1 to step S3, it is determined in step S3 that a failure in which the torque capacity of the clutch 8 is incapable to be raised to the required value has occurred.

The content of step S1 of FIG. 1 may be modified from that described above. For example, the determination content at step S1 may be set so that if the difference between an actual engine speed and an estimated engine speed is within a prescribed threshold range, the process proceeds to step S2, while if the difference between an actual engine speed and an estimated engine speed exceeds the prescribed threshold range, the process proceeds to step S3.

Next, another control example will be described in connection with the flowchart of FIG. 3. In this control example, a failure in the clutch 8 is determined based on actual and estimated engine speeds. The control example of FIG. 3 is also conducted on the assumption that the transmission 9 is operating normally.

Figure 3:
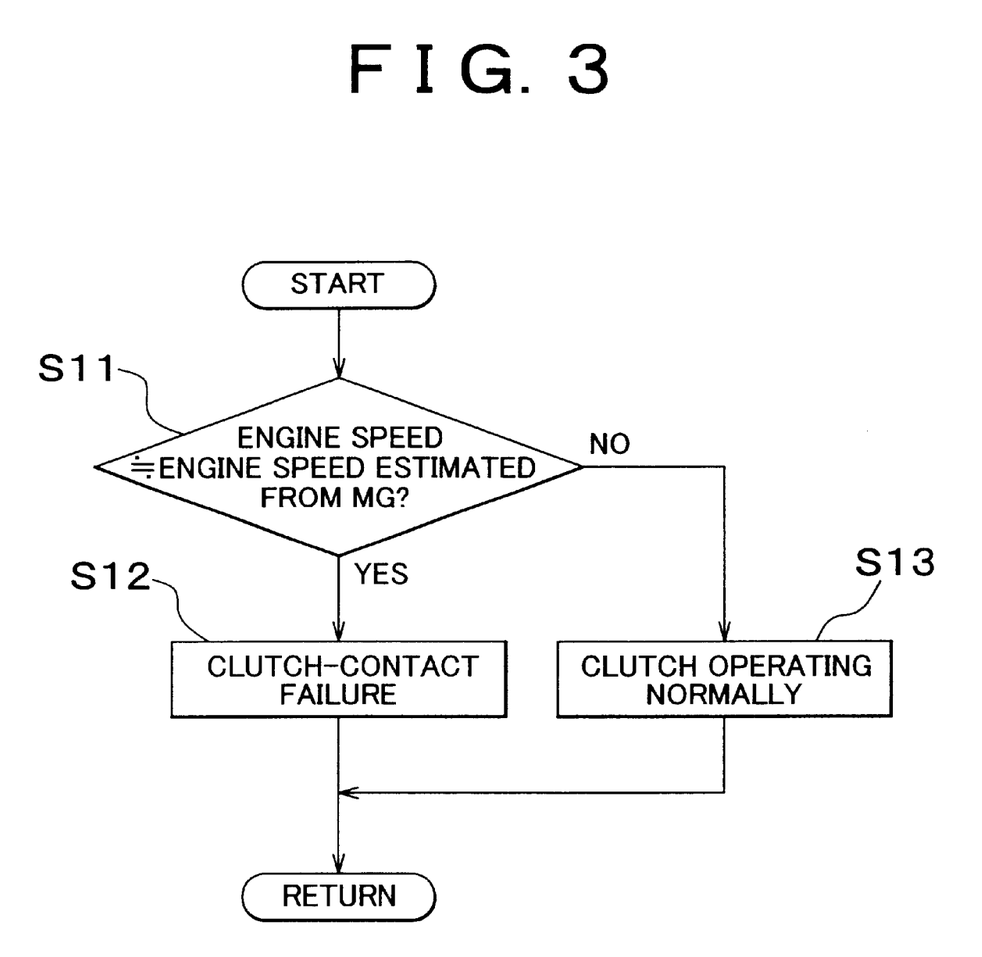
FIG. 3 is a flowchart illustrating another embodiment of the control process according to the invention.

In the control example of FIG. 3, it is first determined whether or not an actual engine speed is approximately equal to an estimated engine speed (step S1). If YES in step S11, it is determined that the clutch 8 is failed (step S12), and the routine returns to start. For example, when a frictional clutch (including a contact-type electromagnetic clutch) or a torque converter with a lock-up clutch is used as the clutch 8 and a request to control the engaging pressure of the clutch 8 to a prescribed value or less (specifically, a request to disengage the clutch 8) has been generated, if the process proceeds from step S11 to step S12, it is determined in step S12 that a failure in which the engaging pressure of the clutch 8 is reduced to the required value, specifically, a failure in which the clutch 8 is incapable to be disengaged (i.e., a clutch-contact failure) has occurred.

Alternatively, when a non-contact electromagnetic clutch or a variable-capacity torque converter is used as clutch 8 and a request to reduce the torque capacity of the clutch 8 to a prescribed value has been generated, if the process proceeds from step S11 to step S12, it is determined in step S12 that a failure in which the torque capacity of the clutch 8 is incapable to be reduced to the required value has occurred.

If NO in step S11, it is determined that the torque capacity of the clutch 8 has been normally controlled as requested (step S13), and the routine returns to start. The content of step S11 may be modified from that described above. For example, the determination content at step S1 may be set so that if the difference between an actual engine speed and an estimated engine speed is within a prescribed threshold range, the process proceeds to step S13, while if the difference between an actual engine speed and an estimated engine speed is smaller than the prescribed threshold range, the process proceeds to step S12.

Figure 4:
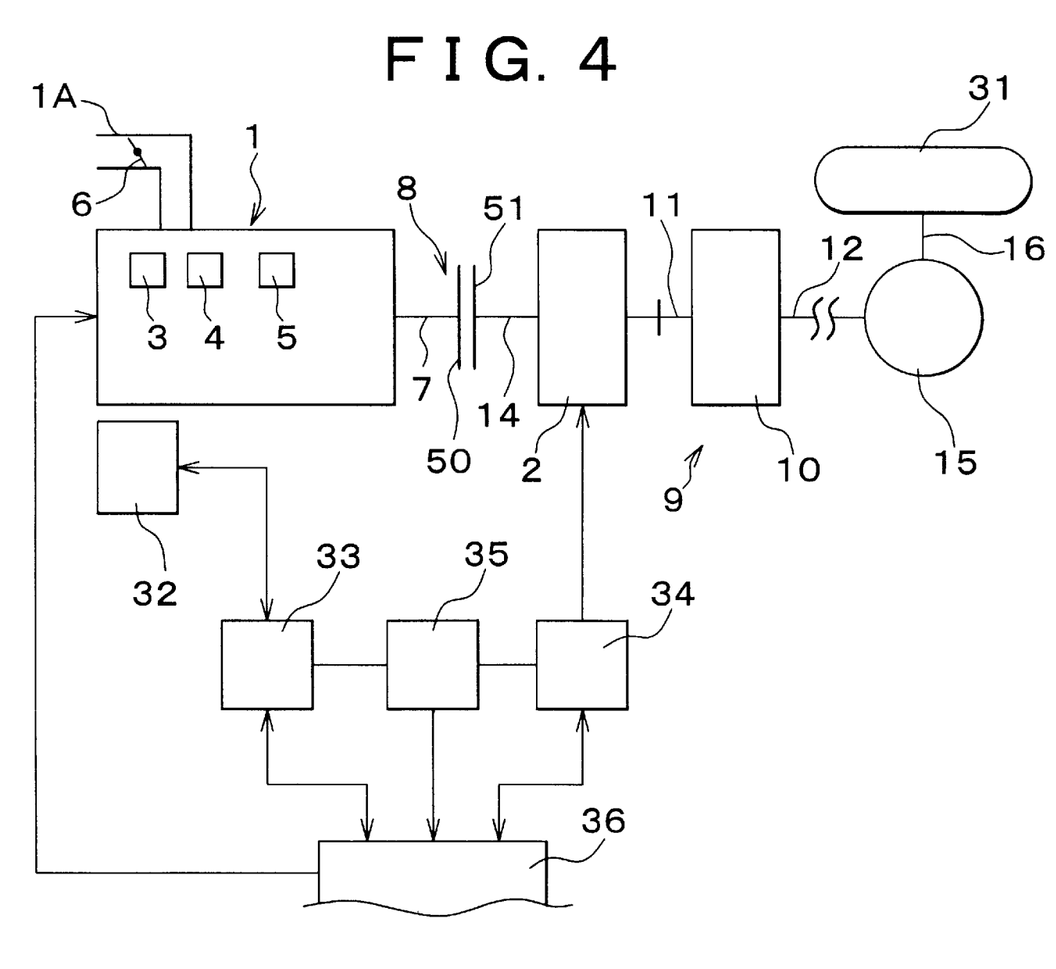
FIG. 4 is a diagram showing another power train of the hybrid vehicle to which the invention may be applied.

FIG. 4 is a block diagram showing another power train of the hybrid vehicle. In FIG. 4, the transmission 9 is provided in the power transmission path between the motor generator 2 and the differential 15. In other words, the power transmission shaft 14 is coupled to a rotor of the motor generator 2, and the clutch 8 is provided between the power transmission shaft 14 and the crankshaft 7. More specifically, the output-side rotating member 51 of the clutch 8 is coupled to one end of the power transmission shaft 14. The input-side rotating member 11 of the transmission 9 is coupled to the other end of the power transmission shaft 14. The output-side rotating member 12 of the transmission 9 is coupled to the differential 15. Since the structure of FIG. 4 is otherwise the same as that of FIG. 2, further description thereof will be omitted. The power train of FIG. 4 is also capable of transmitting the torque of at least either the engine 1 or the motor generator 2 to the wheel 31 via the transmission 9.

The control example of FIG. 1 or 3 can be applied to the power train of FIG. 4. In the power train of FIG. 4, the transmission 9 is not provided between the output-side rotating member 51 of the clutch 8 and the power transmission shaft 14 of the motor generator 2. Accordingly, when the control of FIG. 1 or 3 is applied to the power train of FIG. 4 to determine a failure in the clutch 8, it is conducted regardless of whether or not the transmission 9 is operating normally.

It is also possible to apply the control example of FIG. 1 to the power train of FIG. 2 to determine a failure in the transmission 9. In this case, the control of FIG. 1 is conducted on the assumption that it has been determined based on the signal of the clutch fail sensor 38 that the clutch 8 is operating normally.

Failure determination of the transmission 9 based on the control example of FIG. 1 will now be described. It is determined in step S1 whether or not an actual engine speed is approximately equal to an estimated engine speed. Here, the estimated engine speed is calculated based on the input revolution speed of the motor generator 2 and the required gear ratio of the transmission 9. The required gear ratio is determined based on the signal of the selection apparatus sensor 22, and the like. In the case where the transmission 9 is capable of automatically controlling the gear ratio based on the running state of the vehicle, the required gear ratio is determined also based on the gearshift maps stored in the ECU 36, and the like.

Then, if YES in step S1, it is determined that a system for controlling the gear ratio of the transmission 9 is operating normally (step S2), and the routine returns to start. In other words, an actual gear ratio of the transmission 9 approximately corresponds to the required gear ratio. If NO in step S1, it is determined that the system for controlling the gear ratio of the transmission 9, e.g., the transmission actuator 29, has failed (step S3), and the routine returns to start. In the control example of FIG. 1, it is also possible to determine the state of a clutch 8 other than the failure.

For example, when a request to change the torque capacity of the clutch 8 from a prescribed value to another value has been generated and it has been determined in step S1 whether or not an actual engine speed is approximately equal to an estimated engine speed corresponding to another torque capacity described above, the control can be conducted as follows: if YES in step S1, it is determined that the torque capacity change of the clutch 8 has been completed (step S2), and the routine returns to start; while if NO in step S1, it is determined that the torque capacity change of the clutch 8 has not been completed (step S3), and the routine returns to start. Such control enables accurate determination of the progress in the torque capacity change of the clutch 8.

Furthermore, when a request to change the gear ratio of the transmission 9 from a prescribed value to another value has been generated and it is determined in step S1 whether or not an actual engine speed is approximately equal to an estimated engine speed corresponding to another gear ratio described above, the control can be conducted as follows: if YES in step S1, it is determined that the gear ratio change of the transmission 9 has been completed (step S2), and the routine returns to start; while if NO in step S1, it is determined that the gear ratio change of the transmission 9 has not been completed (step S3), and the routine returns to start. Such control enables accurate determination of the progress in the gear ratio change of the transmission 9.

Steps S1 to S3 of FIG. 1 and steps S11 to S13 of FIG. 3 correspond to techniques for determining a power transmission mode according to an aspect of the invention.

Figure 5:
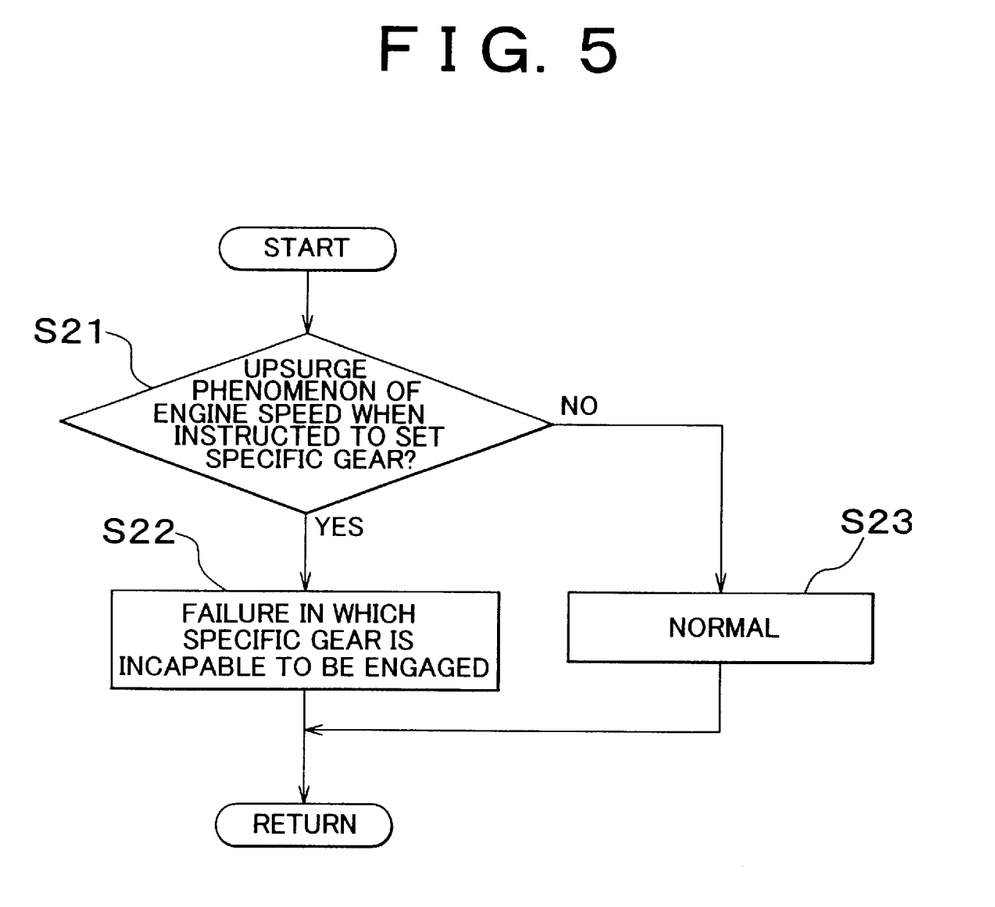
FIG. 5 is a flowchart illustrating still another embodiment of the control process according to the invention.

Still another control example applicable to the power train of FIG. 2 will now be described in connection with FIG. 5. The control example of FIG. 5 is conducted on the assumption that it has been determined based on the signal of the clutch fail detection sensor 38 that the clutch 8 is operating normally. First, when an instruction to set the gear ratio of the transmission 9 to a specific gear, i.e., a specific gear ratio is made, an actual engine speed determined from the signal of the engine speed sensor 17 is compared with a target engine speed obtained from the vehicle speed and the specific gear ratio to determine whether or not a so-called upsurge phenomenon, i.e., a phenomenon that the actual engine speed exceeds the target engine speed, has occurred (step S21).

If YES in step S21, it is determined that a failure in which the specific gear ratio is incapable to be engaged in the transmission 9 has occurred (in step S22), and the routine returns to start. For example, when a transmission having a known planetary gear mechanism and known frictional engaging apparatus is used as the transmission 9, a failure in which the frictional engaging apparatus to be engaged so as to set the specific gear ratio is incapable to be engaged can be detected in steps S21 and S22.

When a belt-type continuously variable transmission is used as the transmission 9, a failure in which the groove width of the driving pulley is incapable to be set so as to correspond to the specific gear ratio can be detected in steps S21 and S22. Furthermore, when a toroidal-type continuously variable transmission is used as the transmission 9, a failure in which the contact radius between each disk and the power roller is incapable to be set so as to correspond to the specific gear ratio can be detected in steps S21 and S22.

If NO in step S21, it is determined that a system for controlling the gear ratio of the transmission 9 is operating normally (step S23), and the routine returns to start.

Figure 6:
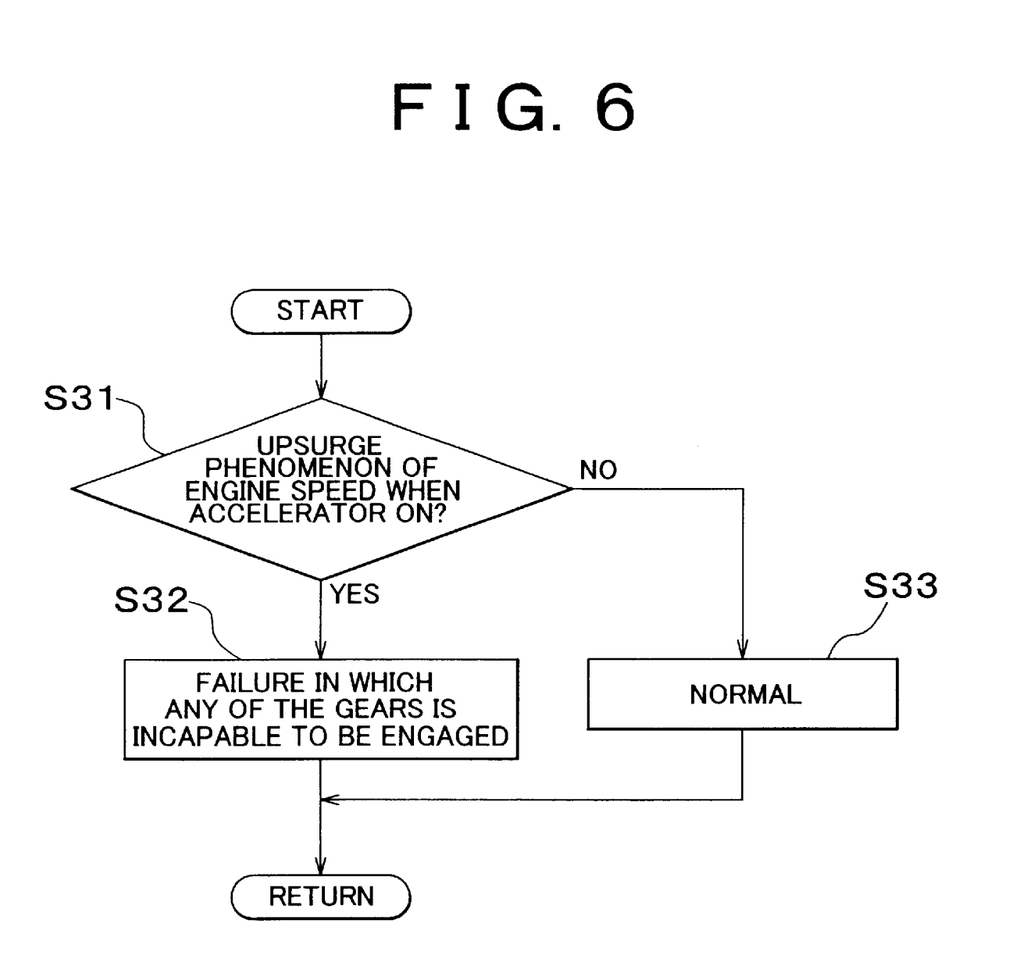
FIG. 6 is a flowchart illustrating yet another embodiment of the control process according to the invention.

Next, yet another control example applicable to the power train of FIG. 2 will be described in connection with FIG. 6. The control example of FIG. 6 is conducted on the assumption that it has been determined based on the signal of the clutch fail detection sensor 38 that the clutch 8 is operating normally. First, with the accelerator pedal being depressed, an instruction is made to set the gear ratio to one of the gear ratios selectable by the transmission 9. It is then determined whether or not the aforementioned upsurge phenomenon of the engine 1 has occurred (step S31).

If YES in step S31, it is determined that a failure in which the gear ratio is unable to be set to any one of the gear ratios selectable by the transmission 9 has occurred (step S32), and the routine returns to start. For example, when a transmission having a known planetary gear mechanism and known frictional engaging apparatus is used as the transmission 9, a failure in which any one of the frictional engaging apparatus for enabling power transmission between the input-side rotating member 11 and the output-side rotating member 12 is able to be engaged can be detected in steps S31 and S32.

When a belt-type continuously variable transmission is used as the transmission 9, a failure in which the belt tension is incapable to be raised above a prescribed value, a defect that the belt has been cut, or the like can be detected in steps S31 and S32. When a toroidal-type continuously variable transmission is used as the transmission 9, a failure in which the pressing force of the power roller against each disk is to be raised above a prescribed value can be detected in steps S31 and S32. If NO in step S31, it is determined that a system for controlling the gear ratio of the transmission 9 is operating normally (step S33), and the routine returns to start.

Figure 7:
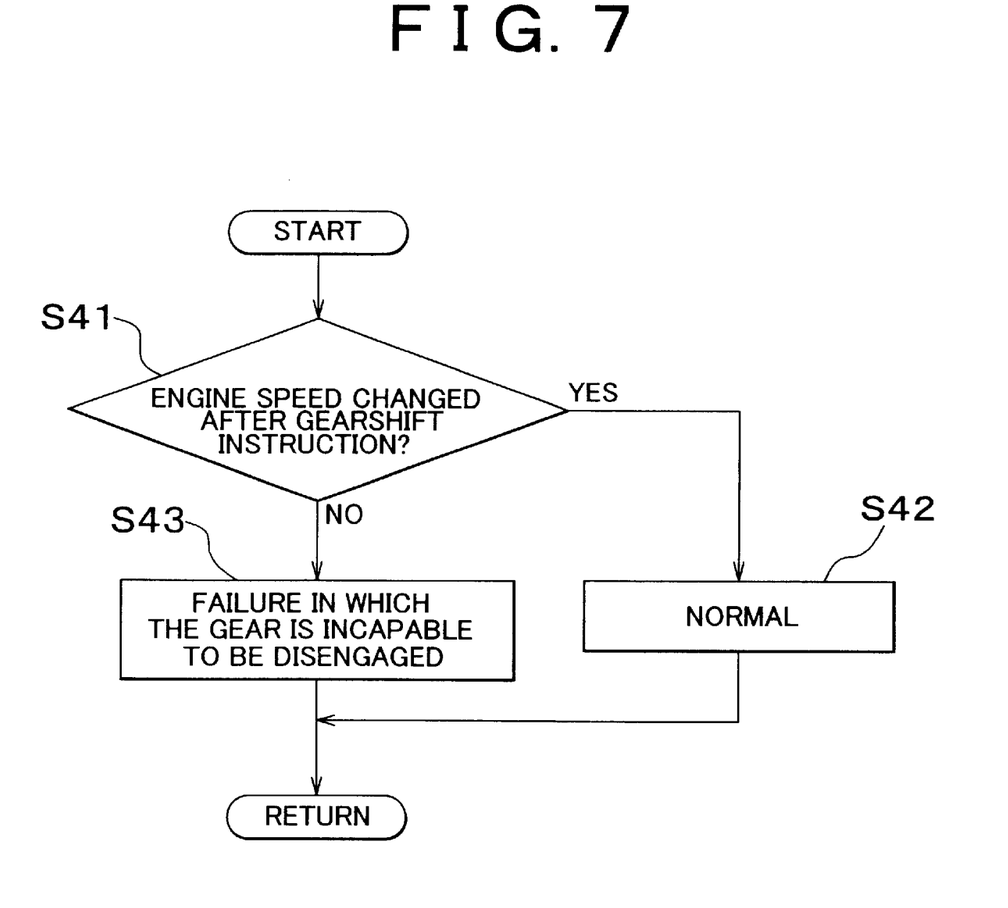
FIG. 7 is a flowchart illustrating a further embodiment of the control process according to the invention.

A further control example applicable to the power train of FIG. 2 will now be described in connection with FIG. 7. The control example of FIG. 7 is conducted on the assumption that it has been determined based on the signal of the clutch fail detection sensor 38 that the clutch 8 is operating normally. First, the engine speed calculated from the signal of the engine speed sensor 17 is compared before and after an instruction is made to change the gear ratio of the transmission 9 from a prescribed gear ratio to another. Thus, it is determined whether or not the engine speed has changed after the instruction (step S41). If YES in step S41, it is determined that a system for controlling the gear ratio of the transmission 9 is operating normally as instructed (step S42), and the routine returns to start.

If NO in step S41, it is determined that a failure in which the gear ratio of the transmission 9 is incapable to be changed from the prescribed gear ratio to another has occurred (step S43), and the routine returns to start. For example, when a transmission having a known planetary gear mechanism and known frictional engaging apparatus is used as the transmission 9, a failure in which the frictional engaging apparatus is incapable to be switched between the engaged/disengaged states can be detected in steps S41 and S43.

Also, when a belt-type continuously variable transmission is used as the transmission 9, a failure in which the groove width of the driving pulley is incapable to be changed from a groove width corresponding to the prescribed gear ratio to another corresponding to another gear ratio can be detected in steps S41 and S43. Furthermore, when a toroidal-type continuously variable transmission is used as the transmission 9, a failure in which the contact radius of the power roller for each disk is incapable to be changed from a contact radius corresponding to the prescribed gear ratio to another corresponding to another gear ratio can be detected in steps S41 and S43. The control examples of FIGS. 5 to 7 are also applicable to a vehicle that is not provided with the motor generator 2 and the inverter 34 in the power train of FIG. 2.

Assuming that the transmission 9 is operating normally, a failure in the clutch 8 can also be determined in the control example of FIG. 5. For example, the control can be conducted as follows: it is determined in step S21 whether or not the upsurge phenomenon of the engine speed has occurred after an instruction is made to increase the torque capacity of the clutch 8 according to the increase in the engine torque; and if YES in step S21, it is determined that a failure in which the torque capacity of the clutch 8 is incapable to be increased to the required value has occurred (step S22), and the routine returns to start; while if NO in step S21, it is determined that the torque capacity of the clutch 8 has been increased normally to the required value (step S23), and the routine returns to start.

Steps S21 to S23 of FIG. 5, steps S31 to S33 of FIG. 6 and steps S41 to S43 of FIG. 7 correspond to techniques for determining a power transmission mode according to additional aspects of the invention.

By conducting any one of the control examples of FIGS. 1, 3 and 5 to 7, whether or not there is a failure in the clutch 8 or the transmission 9, the state of the failure, and the like can be determined specifically. Outputting the determination result from the failure state output apparatus 37 allows the driver to recognize the failure. Thus, control corresponding to the failure in the clutch 8 or the transmission 9 can be conducted based on the determination result.

For example, when actual driving power exceeds a required power due to the failure in the clutch 8 or the transmission 9, the motor generator 2 can be operated as a generator to conduct a control for recovering a part of the power of the engine 1. In contrast, when the actual driving power becomes smaller than the required power due to the failure in the clutch 8 or the transmission 9, the motor generator 2 can be operated as an electric motor to compensate for the insufficient driving power. Accordingly, even if the clutch 8 or the transmission 9 fails, the vehicle can be prevented from becoming incapable of running due to insufficient driving power, while excessive generation of the driving power can also be suppressed, whereby degradation in drivability can be prevented. In other words, each control example covers a part of the fail-safe control against failures of the clutch 8 and the transmission 9.

Whether or not there is a failure in the clutch 8 or the transmission 9 and the state of the failure are determined based on the signals of an existing system for controlling the engine 1 and the motor generator 2, more specifically, based on the signals of the engine speed sensor 17 and the revolution speed detection sensor 52. Therefore, a special failure determination apparatus (such as a sensor) need not be additionally provided in order to determine whether or not there is a failure in the clutch 8 or the transmission 9 and the state of the failure. This can suppress an increase in the number of components, and consequently in manufacturing costs. Thus, it can be said that each of the above control examples provides a novel application of the information obtained from existing sensors and effectively utilizes such information. Moreover, whether or not there is a failure in the clutch 8 or the transmission 9 and the state of the failure can be determined even if the clutch fail detection sensor 38 or the transmission fail detection sensor 39 fails.

Although in steps S1 and S11 of the control examples of FIGS. 1 and 3, the engine speed itself calculated from the signal of the engine speed sensor 17 is used as a physical quantity associated with the engine speed, another physical quantity, e.g., a throttle opening amount, may alternatively be used. Furthermore, although in steps S1 and S11 of FIGS. 1 and 3, the revolution speed itself calculated from the signal of the revolution speed sensor 52 is used as information indicating the state of the motor generator 2, information for controlling the revolution speed of the motor generator 2, e.g., a current value of the electric power supplied to the motor generator 2 may alternatively be used.

In the illustrated embodiment, the controller (the ECU 36) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An apparatus for determining a state of a power train, comprising:
    a first driving power source;
    a second driving power source;
    a power transmission apparatus that transmits power of the first driving power source to an input side of the second driving power source; and
    a controller that determines a failure in the power transmission apparatus based on a physical quantity associated with a revolution speed of the first driving power source and information indicating a state of the second driving power source.

2. The apparatus according to claim 1, wherein:
    the power transmission apparatus includes a clutch and a transmission; and
    the controller determines, when a first one of the clutch and the transmission has a normal power transmission state, a failure in a second one of the clutch and the transmission, based on the physical quantity associated with the revolution speed of the first driving power source and the information indicating the state of the second driving power source.

3. The apparatus according to claim 2, wherein the information indicating the state of the second driving power source is an input revolution speed of the second driving power source.

4. The apparatus according to claim 1, wherein the information indicating the state of the second driving power source is an input revolution speed of the second driving power source.

5. The apparatus according to claim 1, wherein the power train is part of a hybrid-electric vehicle, the first driving power source is an internal combustion engine, and the second driving power source is a motor-generator.

6. The apparatus according to claim 1, wherein the power train is part of a hybrid-electric vehicle, the first driving power source is a motor-generator, and the second driving power source is an internal combustion engine.

7. An apparatus for determining a state of a power train, comprising:
    a power transmission apparatus coupled to an output side of a driving power source; and
    a controller that determines a failure in the power transmission apparatus based on a physical quantity associated with a revolution speed of the driving power source.

8. The apparatus according to claim 7, wherein:
    the power transmission apparatus includes a clutch and a transmission, and is configured to transmit power of the driving power source to the transmission via the clutch; and
    the controller determines, when a first one of the clutch and the transmission operates normally, a failure in a second one of the clutch and the transmission, based on the physical quantity associated with the revolution speed of the driving power source.

9. The apparatus according to claim 8, wherein the controller determines that a failure has occurred in the transmission, when the clutch operates normally and the revolution speed of the driving power source does not correspond to a revolution speed corresponding to a prescribed gear ratio that is commanded to be set by the transmission, the determined failure being a failure in which a gear ratio of the transmission is unable to be set to the prescribed gear ratio.

10. The apparatus according to claim 8, wherein the controller determines that a failure has occurred in the transmission, when the clutch operates normally and the revolution speed of the driving power source does not correspond to any one of revolution speeds respectively corresponding to all of the gear ratios that can be set by the transmission, the determined failure being a failure in which a gear ratio of the transmission is unable to be set to any one of all of the gear ratios.

11. The apparatus according to claim 8, wherein the controller determines that a failure has occurred in which a gear ratio of the transmission cannot be changed, when the clutch operates normally and the revolution speed of the driving power source does not change in response to a request to change the gear ratio of the transmission.

12. The apparatus according to claim 7, wherein the power train is part of a hybrid-electric vehicle, the driving power source includes a first driving power source and a second driving power source, the first driving power source is a motor-generator, and the second driving power source is an internal combustion engine.

13. The apparatus according to claim 7, wherein the power train is part of a hybrid-electric vehicle, the driving power source includes a first driving power source and a second driving power source, the first driving power source is an internal combustion engine, and the second driving power source is a motor-generator.

14. A method of determining a state of a power train that includes a first driving power source, a second driving power source, and a power transmission apparatus that transmits power of the first driving power source to an input side of the second driving power source, the method comprising the step of:
    determining a failure in the power transmission apparatus based on a physical quantity associated with a revolution speed of the first driving power source and information indicating a state of the second driving power source.

15. The method according to claim 14, wherein the power transmission apparatus includes a clutch and a transmission, and the determining step includes:
    determining, when a first one of the clutch and the transmission has a normal power transmission state, a failure in a second one of the clutch and the transmission, based on the physical quantity associated with the revolution speed of the first driving power source and the information indicating the state of the second driving power source.

16. The method according to claim 15, wherein the information indicating the state of the second driving power source is an input revolution speed of the second driving power source.

17. The method according to claim 14, wherein the information indicating the state of the second driving power source is an input revolution speed of the second driving power source.

18. The method according to claim 14, wherein the power train is part of a hybrid-electric vehicle, the first driving power source is an internal combustion engine, and the second driving power source is a motor-generator.

19. The method according to claim 14, wherein the power train is part of a hybrid-electric vehicle, the first driving power source is a motor-generator, and the second driving power source is an internal combustion engine.

20. A method of determining a state of a power train that includes a power transmission apparatus coupled to an output side of a driving power source, the method comprising the step of:

determining a failure in the power transmission apparatus based on a physical quantity associated with a revolution speed of the driving power source.

21. The method according to claim 20, wherein the power transmission apparatus includes a clutch and a transmission, and is configured to transmit power of the driving power source to the transmission via the clutch, and the determining step includes:

determining, when a first one of the clutch and the transmission operates normally, a failure in a second one of the clutch and the transmission, based on the physical quantity associated with the revolution speed of the driving power source.

22. The method according to claim 21, wherein the determining step includes determining that a failure has occurred in the transmission, when the clutch operates normally and the revolution speed of the driving power source does not correspond to a revolution speed corresponding to a prescribed gear ratio that is commanded to be set by the transmission, the determined failure being a failure in which a gear ratio of the transmission is unable to be set to the prescribed gear ratio.

23. The method according to claim 21, wherein the determining step includes determining that a failure has occurred in the transmission, when the clutch operates normally and the revolution speed of the driving power source does not correspond to any one of revolution speeds respectively corresponding to all of the gear ratios that can be set by the transmission, the determined failure being a failure in which a gear ratio of the transmission is unable to be set to any one of all of the gear ratios.

24. The method according to claim 21, wherein the determining step includes determining that a failure has occurred in which a gear ratio of the transmission cannot be changed, when the clutch operates normally and the revolution speed of the driving power source does not change in response to a request to change the gear ratio of the transmission.

25. The method according to claim 20, wherein the power train is part of a hybrid-electric vehicle, the driving power source includes a first driving power source and a second driving power source, the first driving power source is a motor-generator, and the second driving power source is an internal combustion engine.

26. The method according to claim 20, wherein the power train is part of a hybrid-electric vehicle, the driving power source includes a first driving power source and a second driving power source, the first driving power source is an internal combustion engine, and the second driving power source is a motor-generator.

* * * * *